Figure 1:
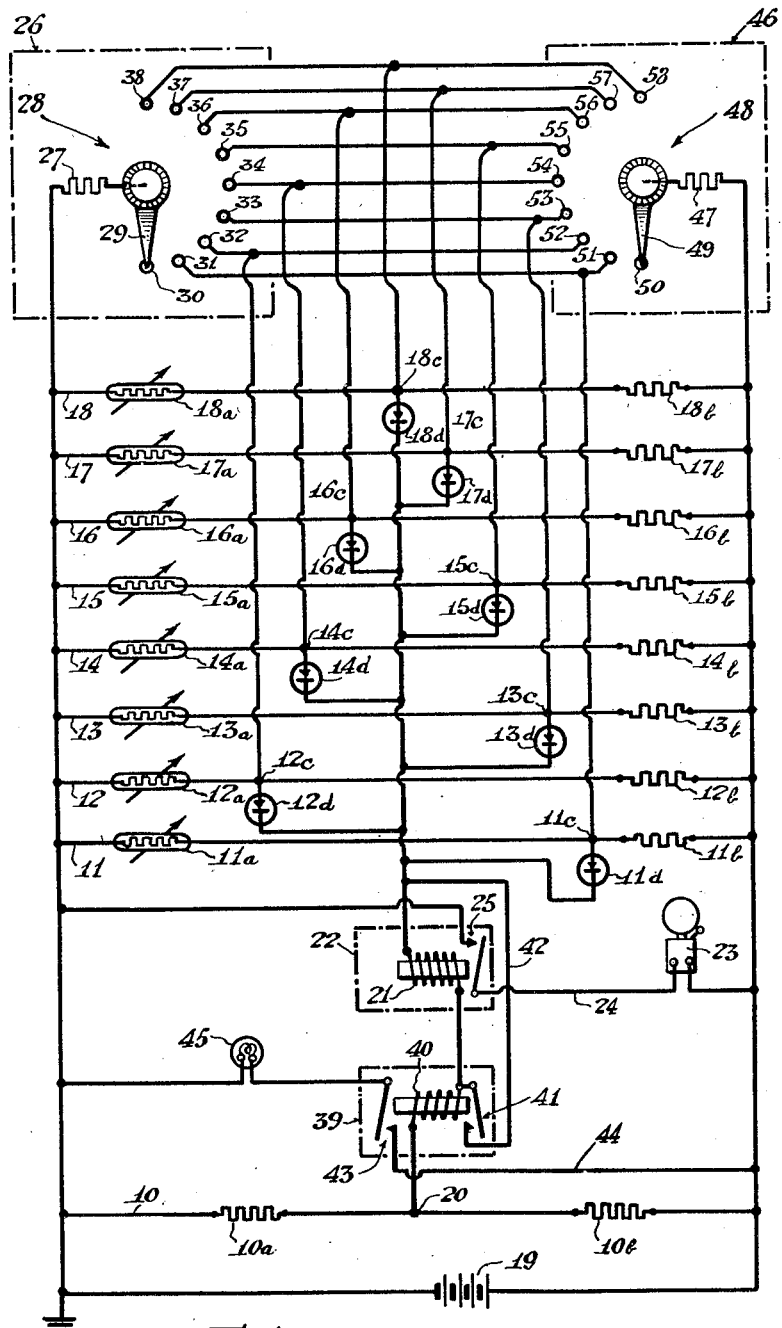

Dec. 14, 1948.  G. H. FRITZINGER  2,456,499
ELECTRICAL CONTROL AND/OR MEASURING SYSTEM
Filed Dec. 26, 1947  2 Sheets-Sheet 1

Inventor
George H. Fritzinger
By Henry Lanahan
Attorney

Dec. 14, 1948.  G. H. FRITZINGER  2,456,499
ELECTRICAL CONTROL AND/OR MEASURING SYSTEM
Filed Dec. 26, 1947  2 Sheets-Sheet 2

Inventor
George H. Fritzinger
By Henry Lanahan
Attorney

Patented Dec. 14, 1948

2,456,499

UNITED STATES PATENT OFFICE 2,456,499

ELECTRICAL CONTROL AND/OR MEASURING SYSTEM

George H. Fritzinger, West Orange, N. J., assignor to Thomas A. Edison, Incorporated, West Orange, N. J., a corporation of New Jersey Application December 26, 1947, Serial No. 794,043

19 Claims. (Cl. 177—311)

This invention relates to improvements in systems adapted to respond to whichever of a plurality of conditions has a value of greatest extreme such as those disclosed in the pending application Serial No. 791,336 of Frederick G. Kelly, filed December 12, 1947, and having a common assignee with the present application.

A general object is to provide systems of this character with means for testing them for operability and for finding the nature and location of defects therein whenever the system becomes inoperative.

In the mentioned Kelly application there is particularly described a plural bridge system controlling a relay to produce an alarm whenever the temperature at any one of a plurality of different locations exceeds a given threshold value. One object of this invention is to provide a simple means for determining, when an alarm has been given, which of those localities has the temperature exceeding the threshold value.

Another object is to provide such system with means adapted to prevent giving any false alarm should an abnormal condition develop in the system.

Another object is to provide such control system with a simple selector means for shutting off the alarm and conditioning the system for detecting a maximum threshold temperature at all remaining localities.

Another object is to provide such a control system selector means for checking the temperature-responsive elements for "opens" and "shorts" and determining which of the elements is defective and the nature of the defect.

Another object is to provide such system with means to render the relay ineffective to control the alarm, or other device controlled thereby as the case may be, whenever any abnormal condition develops in the system causing the relay to be supplied with overload current—i. e., a current substantially higher than the current required to operate the relay.

A further object is to provide such control system with means to give a warning signal whenever an abnormal condition develops.

A further object is to provide such system with a selector means to shut off the warning signal when an abnormal condition develops in any one of the several bridges and to restore the relay to effective condition as to all remaining bridges thereof.

As has been clearly described in the aforementioned Kelly application, systems of the character described are not limited to control purposes but are applicable as well to measuring and indicating purposes. Since the present invention has also such broader application, it is intended that there be no unnecessary limitation of the invention and the foregoing objects to control systems per se.

Also, as will be hereinafter apparent, the present invention and foregoing objects are applicable broadly to control and/or measuring systems adapted to respond to any one of several conditions when that condition reaches a given extreme in either direction—i. e., a given maximum or minimum value.

These and other objects and features of my invention will be apparent from the following description and the appended claims.

Figure 2:
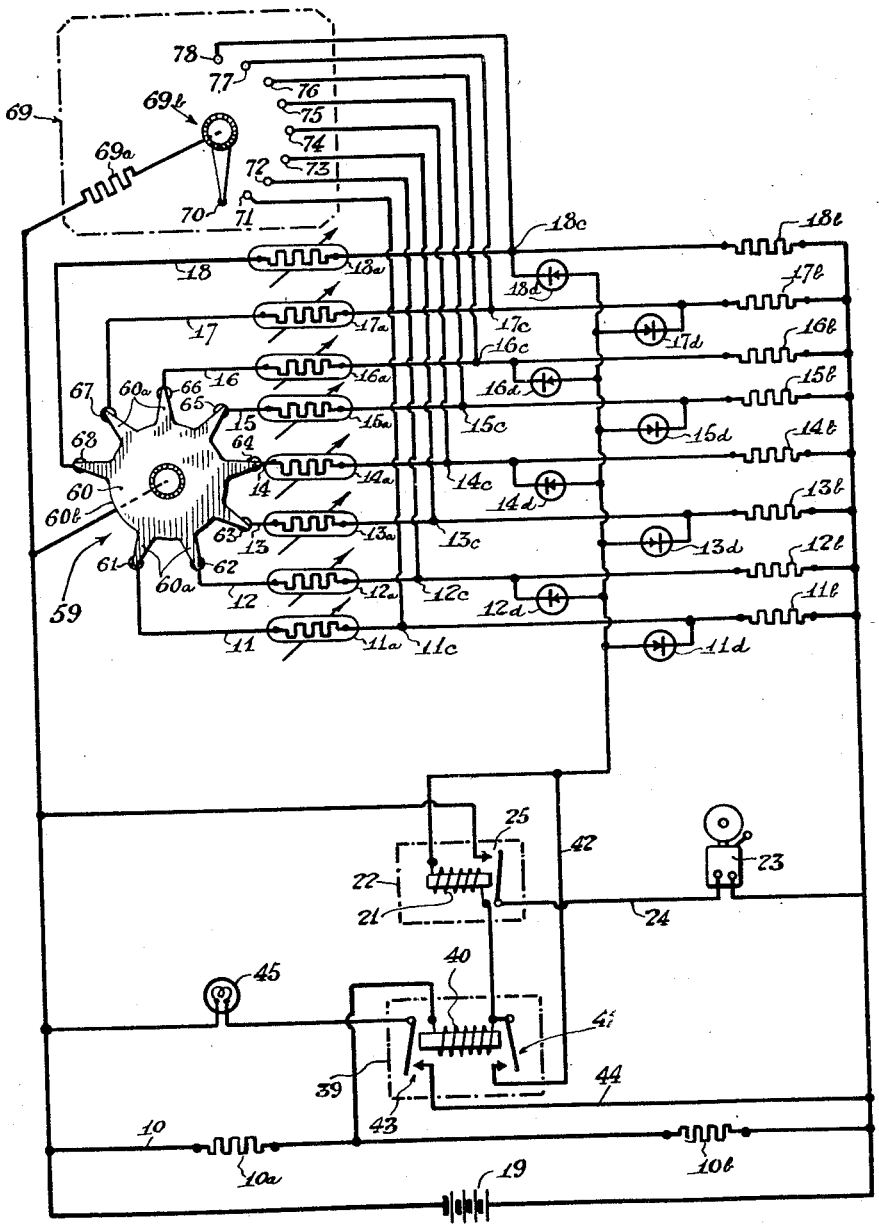

In the description of my invention reference is had to the accompanying drawings, of which:

Figure 1 is a diagrammatic view of one system embodying my invention, which is responsive to a condition of maximum value; and Figure 2 is a similar diagrammatic view incorporating my invention and adapted to respond to a condition of minimum value.

The control system shown in Figure 1 by way of preferred illustration comprises a plurality of electrical bridges having a common branch 10 including two normally-fixed resistors 10a and 10b in series. The other branches of these bridges, of which eight are shown by way of example, have the numbers 11 to 18 respectively. Each of these other branches comprises a variable resistor and a fixed resistor in series referred to by the reference number of the branch with the suffix letters a and b respectively. All of these branches are connected in parallel to a common source of direct current such for example as a battery 19.

Each of the bridges has a cross arm connected from a junction 20 between the resistors 10a and 10b of the common branch to a junction between the resistors in the other branch thereof, this junction being referred to by the number of the branch with the suffix letter c. A coil 21 of a relay 22 is connected in common with each of these branches. Additionally, each branch includes a rectifier in series with the relay, the rectifiers being referred to by the number of the respective branch with the suffix letter d. All of these rectifiers are poled in the same direction with respect to the relay coil 21.

By way of typical example, the variable resistors 11a—18a may be temperature-responsive and may be in the form of resistor bulbs such as that described and disclosed in the Kelly Patent No. 2,398,892, issued April 23, 1946. These bulbs may be mounted on or in the bearings of railway cars to detect the temperatures thereof and to cause the system to give an alarm, or for example to stop the train, when any of those bearings reaches a dangerously high temperature. In this illustrative embodiment for giving an alarm when the maximum temperature of any one of a plurality of localities reaches a given threshold value, the respective rectifiers 11d—18d are poled to pass current only when the potential of any one of the respective junctions 11c—18c exceeds that of the junction 20 in the common branch by a given margin. In other words, at the threshold temperature at which an alarm is to be given the ratio of the resistors 11a to 11b, as for the first bridge, must be greater than that of the resistors 10a to 10b by a suitable margin sufficient to cause the respective rectifier to be conducting and to pass enough current to operate the relay 22. When the relay is thus operated it closes a circuit 24 for an alarm such as an electric bell 23, the circuit 24 being connected across the battery 19 and serially including contacts 25 of the relay 22. Until one of the variable resistors increases to fulfil this condition all of the rectifiers are biased negatively to be non-conducting, wherefore the circuit 24 remains then open.

Not only does the present system respond to the condition of greatest extreme when that condition reaches a given threshold value, but it responds only to which of the several conditions has the value of greatest extreme beyond that threshold value. For instance, if the value of one condition goes beyond the threshold value to cause the relay to be operated and then the value of another condition goes still farther beyond the threshold value, the latter will take over control of the system since as the second condition goes to the greater extreme the potential across the relay coil 21 is increased to cause the respective one of the rectifiers 11d—18d controlled by the second condition to be conducting and the respective one of the rectifiers 11d—18d controlled by the first condition to be rendered non-conducting. The value of the second condition will however have to go beyond the first by a suitable margin before it will take over fully the control of the system. This is because the resistance-voltage characteristic of rectifiers is one wherein the resistance falls with finite slope from a high finite value of the order of several hundred thousand ohms to several hundred ohms as the voltage across the rectifier increases from negative to positive values through a range of the order of one-half volt. The stated margin may however be decreased by increasing the voltage supply of the system and/or the effective load resistance in the cross arms of the bridge.

The control and/or measuring system hereinabove described is in accordance with that disclosed in the pending Kelly application above-mentioned, and is a part of the present invention only by way of combination with apparatus hereinafter described.

The present invention comprises a simple selector means 26 for finding which of the resistors 11a—18a, or the respective localities thereof, is at the threshold temperature when an alarm is given. This selector means comprises simply a test resistor 27 connected to one side of each of the variable resistors 11a—18a, which is in the present case to the negative side of the system, and a selector switch 28 for connecting the test resistor 27 selectively across the respective resistors 11a—18a, the switch 28 comprising a pole member 29 connected to the test resistor and a series of contacts 30—38 of which the first is idle and the others are connected respectively to the junctions 11c—18c. The test resistor 27 has a value preferably less than the threshold value of the respective resistors 11a—18a for reasons which will be hereinafter apparent. Normally the switch pole 29 is left in registration with the idle contact 30. When an alarm is given the operator will sweep the switch pole across the contacts 31—38 in succession. When the pole registers with that one of the contacts 31—38 corresponding to the bridge giving the alarm, say the bridge having the variable resistor 15a, the shunt effect of the test resistor across that resistor 15a will reduce the potential of the junction 15c below a critical value and will render the rectifier 15d non-conducting to stop the alarm. Thus, the locality in which the temperature has reached the threshold value is determined by the positioning of the switch 28 at which the alarm is stopped.

The sensing elements of resistor bulbs are typically made of fine delicate wire and may at times break when the bulb is subjected to heavy vibration typical of railroad use. If one of the resistors 11a—18a should become open-circuited, say the resistor 15a, the potential of the respective junction 15c will be increased far above the critical value necessary to produce an alarm since the cross arm of that bridge is then connected across the battery 19 by way of the resistors 15b and 10a. This causes an abnormally high current several times greater than the operate current of the relay 22—herein referred to as an overload current—to flow through the relay coil 22. This overload current would, of course, operate the relay to give a false alarm unless a preventive means is provided. By the present invention a suitable such preventive means is provided in the form of an overload relay 39 having a coil 40 connected in common with all the cross arms of the several bridges and in series with the relay coil 22. For example, this overload relay may have a pair of normally-open contacts 41 connected in a circuit 42 across the coil 21 of the relay 22, and may further have a second pair of contacts 43 connected in a circuit 44 across the battery 19. In this circuit 44 there is serially included a warning signal lamp 45. The overload relay is set to operate at a current typically two or more times greater than the operate current of the relay 22. Thus, if an overload current develops in one of the cross arms of the several bridges, the overload relay is operated immediately to close the contacts 41 and 43. As the contacts 41 are closed the coil 21 is shorted to disable the relay 22 so that no false alarm is given. At the same time the circuit 44 is closed by the contacts 43 to cause the lamp 45 to give a warning signal to indicate that one of the resistors 11a—18a is open-circuited.

The selector means 26 is also used to ascertain which of the resistors 11a—18a is open-circuited. For instance, as the switch pole 29 is moved successively across the contacts 31-38, the test resistor 27 will be connected in the place of the open-circuited one of the resistors 11a—18a when the switch pole is in a position corresponding to that resistor. Since the test resistor has a value less than the critical value required to give an alarm, it will not only remove the overload condition but will restore the relay 22 to an unoperated condition. Thus, by placing the selector switch 28 in a position wherein the test resistor 27 is connected in place of an open-circuited one of the resistors 11a—18a, the system is restored to operative condition as to all of the resistors 11a—18a except the effective one.

If any of the resistors 11a—18a should become short-circuited no alarm or warning signal is given since the effect of such short-circuiting is to place a negative potential across the respective one of the rectifiers 11d—18d. In order to check the system for "shorts" in any of the resistors 11a—18a, a second selector means 46 is provided. This selector means comprises a test resistor 47 connected at one end to each of the fixed resistors 11b—18b and a selector switch 48 for connecting this test resistor selectively across the respective resistors 11b—18b, the switch 48 comprising a pole member 49 connected to the other side of the resistor 47 and a series of contacts 50-58 of which the first is idle and the others are connected successively to the respective junctions 11c—18c. The test resistor 47 has a value such that when it is connected in parallel with any one of the resistors 11b—18b it will cause the potential of the respective one of the junctions 11c—18c to be raised to the threshold value to give an alarm for all values of the respective resistors 11a—18a above a prescribed minimum, this minimum being typically the value of each of the respective resistors 11a—18a at the minimum temperature to which they are exposed in the particular application of the system. Thus, by moving the selector switch 38 to connect the test resistor 47 successively across the resistors 11b—18b, successive alarms will be given by the respective bridges provided the bridges are in operative condition. If, however, one of the resistors 11a—18a is short-circuited, the connection of the test resistor 47 across the associated one of the resistors 11b—18b will not raise the potential of the respective one of the junctions 11c—18c sufficiently to cause an alarm to be given. Thus, the absence of an alarm at any one position of the selector switch 48 indicates that the corresponding one of the resistors 11a—18a is short-circuited. Since no general warning signal is given when one of the resistors 11a—18a is short-circuited—it being considered unnecessary because a short-circuiting of any one of the resistors 11a—18a does not disable the system as to all remaining ones of these resistors "shorts" are detected by routine checking of the system by the selector means 46.

In Figure 2 there is shown test and checking apparatus for the control system above described when that system is adapted to respond to minimum values instead of maximum values. The control system per se has the same components as in the foregoing embodiment, and these components are given the same reference characters. However, the rectifiers 11d—18d are poled now in a reverse direction so as to pass current only when the respective junctions 11c—18c are at a potential suitably lower than that of the junction 20 in the common branch. For example, whenever in any one of the branches 11—18, say the branch 15, the ratio of the values of the resistors 15a to 15b becomes less than that of the resistors 10a to 10b by a margin sufficient to cause the rectifier 15d to pass current to operate the relay 22, there will be given an alarm by the device 23. Until one of the other resistors 11a—18a reaches a still lower value the other respectively-associated rectifiers 11d—18d are non-conducting. When one of the resistors 11a—18a, say the resistor 11a, reaches a value lower than that of the resistor 15a by a suitable margin it will take over control of the system in the same way as when in the foregoing embodiment the value of one of the resistors 11a—18a goes beyond the maximum value of any of the remaining ones of these resistors then controlling the system.

If, in the second embodiment, a "short" develops in any of the variable resistors 11a—18a an overload current will flow in the respective cross arm to the overload relay 39 to disable the control relay 22 and cause the lamp 45 to give a warning signal. In order to check which of the resistors 11a—18a is so shorted, and to remove the overload condition to render the control system operative as to all remaining ones of the resistors 11a—18a, the same as in the foregoing embodiment, the branches 11-18 are connected to the ground side of the system through a circuit-opening switch 59. This switch comprises a pole 60 in the form of a conductive plate having eight radially-extending fingers 60a at 40° intervals and an open space 60b at the ninth such interval. This pole member is connected to one side of the battery 19. The fingers 60a register respectively with contacts 61—68 connected to the branches 11-18 respectively. As the pole member is turned the open space 60b registers successively with the contacts 61-68 to open successively the arms of the branches 11-18 including the variable resistors 11a—18a. When the branch including the shorted one of the resistors 11a—18a is so opened the overload condition is removed, the warning light is shut off and the relay 22 is restored to unoperated condition whereby to render the system effective as to all remaining ones of the resistors 11a—18a.

If any of the resistors 11a–18a should become open-circuited, the system remains operative as to all remaining ones of the resistors, but no warning signal is given. Such open-circuited condition is to be found by routine testing of the system by the use of a selector means 69 comprising a test resistor 69a and a selector switch 69b for connecting this test resistor selectively across the respective resistors 11a–18a. For instance, the test resistor is connected at one end to each of the resistors 11a-18a and at the other end to the pole of the switch 69b. This pole is movable selectively into registration with a series of contacts 70-78 of which the first is idle and the remaining ones are connected respectively to the junctions 11c-18c. The test resistor 69a has a value such that when it is connected in parallel with any one of the resistors 11a-18a while the latter is at or less than a maximum value—a value which the resistor has when it is at the highest temperature to which it is exposed in the particular application—an alarm will be given. If, however, any of the resistors 11a–18a is open-circuited, no alarm will be given when the test resistor 69a is connected in the place of that resistor since the test resistor itself has a value greater than the threshold value required to give an alarm. Thus, upon routine checking by the selector means 69, any open circuit that may have developed in any one of the resistors 11a–18a is detected by the failure of the system to give an alarm when the selector switch 69b is in a position corresponding to that of the open-circuited resistor.

The foregoing embodiments of my invention are intended to be illustrative and not necessarily limitative of my invention as the same are subject to changes and modifications without departure from the scope of my invention, which I endeavor to express according to the following claims.

I claim:

1. An electrical system comprising a plurality of electrical bridges connected to a D. C. source of current and having a common branch and respective other branches in parallel therewith, an electrical receiving instrument, a cross arm for each of said bridges including said instrument and a rectifier in series, said instrument being common as to all of said cross arms and each of said rectifiers being poled in the same direction relative to said instrument, each of said other branches including a varying resistor and a fixed resistor in series and said common branch being arranged so that as any of said varying resistors reach a predetermined threshold value the respective rectifier becomes conducting to pass current to operate said instrument; and test means for said bridges selectively, comprising a test resistor and a selector switch for connecting said test resistor selectively across said varying resistors of the respective other branches.

2. An electrical system responsive to any one of a plurality of variables when the variable goes beyond a threshold limit, comprising a plurality of electrical bridges connected to a D. C. source of potential and having a common branch, each of the other branches of said bridges including a variable resistor and a fixed resistor in series; an electrical receiving instrument; a cross arm for each of said bridges comprising said electrical receiving instrument and a rectifier in series, said resistor being common to each cross arm and each of said rectifiers being poled to pass current to operate said instrument only when the variable resistor in the respectively associated branch goes in a given direction beyond a given limit; and means for checking open-circuit conditions in said variable resistors selectively, comprising a test resistor and means for selectively connecting said test resistor across said variable resistors, said test resistor having a value through which the values of said variable resistors pass as the same vary in said given direction to said given limit.

3. The electrical system set forth in claim 2 wherein said rectifiers are poled to pass current to operate said receiving instrument only when the value of one or more of said variable resistors exceeds a given threshold value, and said test resistor has a value less than said threshold value.

4. An electrical system responsive to any one of a plurality of variables when that variable exceeds a predetermined maximum, comprising a plurality of electrical bridges connected to a D. C. source of current and having a common branch and respective other branches in parallel therewith, each of said other branches including a variable resistor and a fixed resistor in series; an electrical receiving instrument; a cross arm for each of said bridges comprising said electrical receiving instrument and a rectifier in series, said instrument being common to each cross arm and each of said rectifiers being poled to pass current only when the variable resistor in the respectively associated branch exceeds a given threshold value; and means for checking short-circuit conditions in said variable resistors comprising a test resistor and a switch for connecting said test resistor selectively across said fixed resistor of said other branches.

5. The electrical system set forth in claim 4 wherein each of said variable resistors has a range of variation from said maximum threshold value to a predetermined minimum value, and said test resistor has such value that when it is connected across any one of said fixed resistors the respectively associated rectifier will pass current to operate said instrument unless the respectively associated variable resistor has a value less than said predetermined minimum.

6. An electrical system responsive to any one of a plurality of variables when that variable decreases below a minimum threshold value, comprising a plurality of electrical bridges connected to a D. C. source of current and having a common branch and respective other branches in parallel therewith, each of the other branches of said bridges including a variable resistor and a fixed resistor in series; an electrical receiving instrument; a cross arm for each of said bridges comprising said electrical receiving instrument and a rectifier in series, said instrument being common to each cross arm and each of said rectifiers being poled to pass current only when the respectively associated variable resistor decreases below a given threshold value; and means operable to open-circuit selectively the arms of said other branches including said variable resistors.

7. An electrical control system comprising a plurality of electrical bridges connected to a source of direct current and having a common branch and respective other branches in parallel therewith, each of the other branches including a variable resistor and a fixed resistor in series; an electrical relay; a cross arm for each of said bridges comprising said relay and a rectifier in series, each of said rectifiers being poled to pass current to operate said relay when the value of the respectively associated variable resistor goes beyond a given limit; and means in said cross arms to disable said relay whenever a condition develops in said system causing an overload current to flow in any one of the cross arms.

8. An electrical control system comprising a plurality of electrical bridges connected to a source of direct current and having a common branch and respective other branches in parallel therewith, each of the other branches including a variable resistor and a fixed resistor in series; an electrical relay; a cross arm for each of said bridges comprising said relay and a rectifier in series, each of said rectifiers being poled to pass current to operate said relay when the value of the respectively associated variable resistor goes beyond a given limit; and means common to all of said cross arms for giving a signal whenever a condition develops in the system causing an overload curent to flow through said relay.

9. An electrical control system adapted to produce a control operation when any one of a plurality of variables exceeds a given threshold value, comprising a plurality of electrical bridges connected to a source of direct current and having a common branch and respective other branches in parallel therewith, each of the other branches of said bridges including a variable resistor and a fixed resistor in series; an electrical relay; a cross arm for each of said bridges comprising said relay and a rectifier in series, said rectifiers being poled to pass current to operate said relay only when the maximum value of any of said variable resistors exceeds a given threshold; a device controlled by said relay; and means common to said cross arms and responsive to an overload current in any one thereof caused by the development of an open-circuited condition in any one of said variable resistors for rendering said relay ineffective to control said device and for concurrently giving a warning signal.

10. The control system set forth in claim 9 including a test resistor and switch means operable to connect said test resistor selectively across said respective variable resistors, said test resistor having a value less than said threshold value whereby upon any of the said variable resistors becoming open-circuited to cause an overload current to flow and disable said relay and upon said switch means being operated to connect said test resistor in the place of said one variable resistor, said overload condition is removed and said system is restored to effective condition as to all remaining ones of said variable resistors.

11. An electrical control system adapted to produce a control operation when any one of a plurality of variables exceeds a given threshold value, comprising a plurality of electrical bridges connected to a source of direct current and having a common branch and respective other branches in parallel therewith, each of the other branches of said bridges including a variable resistor and a fixed resistor in series, each of said variable resistors having a range of variation from a predetermined minimum value to values above a given threshold; an electrical relay; a cross arm for each of said bridges comprising said relay; and a rectifier in series, said rectifiers being poled to pass current to operate said relay only when the maximum value of any of said variable resistors exceeds said threshold; a device controlled by said relay; a test resistor; and a switch means operable to connect said test resistor selectively across said respective fixed resistors, said test resistor having such a value that when the same is connected across any one of said resistors the respectively-associated rectifier is conductive to pass current to operate said relay and produce a control operation unless the respectively-associated variable resistor has a value less than said predetermined minimum.

12. A control system comprising a plurality of electrical bridges connected across a source of direct current and having a common branch and respective other branches in parallel therewith, each of the other branches of said bridges including a variable resistor and a fixed resistor in series; an electrically-energizable control relay; a cross arm for each of said bridges comprising said relay and a rectifier in series, said rectifiers being poled in the same direction with respect to said relay; and an overload relay common to all of said branches and adapted to operate whenever the current in said control relay exceeds the operate current of the control relay by a predetermined margin.

13. The control system set forth in claim 12 including means controlled by said overload relay to give a warning signal when the overload relay is operated.

14. The control system set forth in claim 12 including a device controlled by said relay to give an alarm when the relay is operated, and means controlled by said overload relay to render said alarm device inoperative when the overload relay is operated.

15. The control system set forth in claim 12 including a shorting circuit for said control relay contolled by said overload relay to place the control relay in ineffective condition when the overload relay is operated.

16. The electrical system set forth in claim 2 wherein said rectifiers are poled to pass current to operate said receiving instrument only when the value of one or more of said variable resistors is less than a given threshold value, and said test resistor has a value greater than said threshold value.

17. An electrical control system adapted to produce a control operation when any one of a plurality of variables is less than a given threshold value, comprising a plurality of electrical bridges connected to a source of direct current and having a common branch and respective other branches in parallel therewith, each of the other branches of said bridges including a variable resistor and and a fixed resistor in series; an electrical relay; a cross arm for each of said bridges comprising said relay and a rectifier in series, said rectifiers being poled to pass current to operate said relay only when the minimum value of any of said variable resistors is less than a given threshold; a device controlled by said relay; and means common to said cross arms and responsive to an overload current in any one thereof caused by the development of a short circuit in any one of said variable resistors for rendering said relay ineffective to control said device and for concurrently giving a warning signal.

18. The control system set forth in claim 17 including means to open selectively the arms of said other branches including said variable resistors respectively whereby to remove said overload condition and restore said system to operating condition as to all remaining ones of said variable resistors.

19. An electrical control system adapted to produce a control operation when any one of a plurality of variables is less than a given threshold value, comprising a plurality of electrical bridges connected to a source of direct current and having a common branch and respective other branches in parallel therewith, each of the said branches of said bridges including a variable resistor and a fixed resistor in series, each of said variable resistors having a range of variation from a predetermined maximum value to said threshold value and less; an electrical relay; a cross arm for each of said bridges comprising said relay and rectifier in series, said rectifiers being poled to pass current to operate said relay only when the minimum value of any of said variable resistors is less than said threshold value; a device controlled by said relay; a test resistor; and switch means for connecting said test resistor selectively across said variable resistors, said test resistor having such a value that when the same is connected across any one of said variable resistors, while the variable resistor has a value greater than said threshold value and not exceeding said maximum value, the respectively associated rectifier is rendered conductive to pass current to operate said relay and produce a control action.

GEORGE H. FRITZINGER.

No references cited.